US006674620B2

(12) United States Patent
Lamborghini et al.

(10) Patent No.: US 6,674,620 B2
(45) Date of Patent: Jan. 6, 2004

(54) HERMETIC SINGLE PHASE MOTOR PROTECTOR

(75) Inventors: Louis R. Lamborghini, Smithfield, RI (US); Gary K. Maus, South Attleboro, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/970,980

(22) Filed: Oct. 4, 2001

(65) Prior Publication Data

US 2002/0158746 A1 Oct. 31, 2002

Related U.S. Application Data

(60) Provisional application No. 60/251,138, filed on Dec. 4, 2000.

(51) Int. Cl.[7] .................................................. H02H 5/04
(52) U.S. Cl. ............................................ 361/26; 301/26
(58) Field of Search ............................. 361/26, 29, 31, 361/22, 23; 337/102, 107

(56) References Cited

U.S. PATENT DOCUMENTS 4,167,721 A * 9/1979 Senor et al. ................ 337/112
4,376,926 A 3/1983 Senor
4,434,414 A * 2/1984 Bell et al. ................... 337/102
4,555,686 A * 11/1985 Pejouhy et al. ............. 337/102
4,706,152 A 11/1987 DeFilippis et al.
4,713,717 A 12/1987 Pejouhy et al.
4,843,363 A * 6/1989 Ubukata et al. .............. 337/94
5,015,985 A * 5/1991 Ubukata et al. ............ 337/368
5,212,465 A * 5/1993 Mizutani et al. ............ 337/368
6,078,246 A * 6/2000 Davis et al. ................ 337/347

* cited by examiner

*Primary Examiner*—Gregory J. Toatley, Jr.
*Assistant Examiner*—Danny Nguyen
(74) *Attorney, Agent, or Firm*—Frederick J. Telecky, Jr.; Russell E. Baumann

(57) ABSTRACT

A hermetic motor protector (10) has a non-current carrying snap-acting thermostatic disc (26) freely disposed on a disc seat (22*a*) having a tab (22*c*) projecting through a centrally located aperture (26*a*) in the disc. An outer peripheral portion of the disc is received under a leg (22*e*) of the bracket limiting upward motion of the disc at that location and causing the disc to act as a lever pivoting about the disc seat (22*a*) as a fulcrum so that the outer peripheral portion of the disc diametrically opposite to leg (22*e*) engages a motion transfer bump (28*d*) formed on a movable contact arm cantilever mounted on leg (22*e*) when the disc snaps from its normally contacts engaged configuration to its opposite dished contacts open configuration when the disc is heated to its actuation temperature by a heater element (24) along with heat conducted from a motor with which the protector is used.

6 Claims, 2 Drawing Sheets

HERMETIC SINGLE PHASE MOTOR PROTECTOR

This application claims priority under 35 USC Section 119 (e) (1) of provisional application No. 60/251,138 filed Dec. 4, 2000.

FIELD OF THE INVENTION

This invention relates generally to thermally responsive electrical switches and more particularly to such switches which are useful as protectors for electrical motors such as those used for hermetic compressors.

BACKGROUND OF THE INVENTION

Electrical motors which operate compressors in refrigerators and air conditioners, and the like, are typically enclosed in shells together with selected coolant fluids. Such motors are normally provided with motor protector devices, sealed to exclude the coolant fluids, fitted on or near the motor windings to optimize their thermal response to heat generated by the windings. A thermally responsive member is arranged within the typical motor protector device to respond to the winding temperature for moving electrical contact means to open a circuit when the thermally responsive member is heated to a selected temperature. Usually a heater is disposed in heat-transfer relation to the thermally responsive member to be connected in series with the motor for promptly heating the thermally responsive member to open the circuit to the motor when an overload current occurs in the motor's windings. An example of such a motor protector is shown and described in U.S. Pat. No. 4,376,926 assigned to the assignee of the present invention. In motor protectors of this type, a bimetallic, snap-acting disc is cantilever mounted on a heater which in turn is mounted on a terminal pin extending through a header plate electrically isolated from the plate which may be provided with electrically insulated material surrounding the pin to provide a suitable dielectric distance between the pin and the header. An electrically conductive tube shaped housing having a closed end is hermetically attached to the header and is provided with a stationary electrical contact attached to the housing wall in the vicinity of its closed end. A movable electrical contact is mounted on the distal end portion of the disc with the disc adapted to move between a normally contacts engaged, dished shape disc having a concave configuration facing the stationary contact to a contacts opened, convex configuration facing the stationary contact upon being heated to a preselected temperature. The preselected temperature is chosen to prevent overheating of the motor.

In making the above described motor protector, calibration is typically effected by deforming the housing to move the stationary contact to obtain the preselected opening temperature, i.e., the actuation temperature of the disc.

SUMMARY OF THE INVENTION

It is an object of the present invention to provide an improved, lower cost yet reliable hermetic motor protector for use with hermetic compressors, such as 240 VAC, 50/60 Hz compressors. Another object is the provision of a motor protector capable of being mounted on or near a motor winding and having up to 90 amps locked rotor capacity. Yet another object of the invention is the provision of a hermetic motor protector for use with compressor motors which require no temperature calibration after assembly of the protector for meeting motor protection requirements.

Briefly, in accordance with the invention, an elongated header plate is formed with first and second pin receiving apertures through which extend glass sealed, respective first and second terminal pins. A stationary contact is attached to the first terminal pin and a resistive heater element formed in the shape of a loop has one end attached to the second terminal pin and a second end attached to the header plate. A bracket is mounted to the header plate and is formed with a disc seat spaced above the header plate. The disc seat is provided with a vertically upstanding tab which is received in an aperture of a disc, to be discussed below. The bracket is also formed with a generally U-shaped portion having a first leg disposed on the header plate and a second leg spaced above the header plate and extending in a direction toward the stationary contact. A bimetallic, dished shaped circular disc having a centrally located aperture therethrough is disposed on the disc seat with the upstanding tab of the disc seat received through the aperture in the disc and with an edge of the disc received under the distal free end of the second leg of the U-shaped bracket portion. A movable spring contact arm, also preferably provided with an aperture, has one end cantilever mounted to the top of the second leg of the U-shaped bracket portion with the aperture in the arm aligned with the upstanding tab of the disc seat. A movable contact is mounted on the bottom side of the spring contact arm and is normally biased into electrical engagement with the stationary contact. The spring contact arm is preferably provided with a downwardly extending motion transfer projection such as by deforming a portion of the spring contact arm into a bump, which is aligned with the edge portion of the disc diametrically opposite the second leg of the U-shaped bracket portion. When the disc snaps from a normal downwardly facing, i.e., toward the header plate, concave configuration at ambient temperature with the disc completely unrestrained to an oppositely shaped downwardly facing convex configuration, the disc moves against the second leg and pivots on the disc seat with the disc performing as a lever so that the outer peripheral portion of the disc which is diametrically opposite to the second leg engages the motion transfer projection and moves the spring contact arm upwardly and concomitantly the movable contact out of electrical engagement with the stationary contact. The top of the disc seat against which the disc pivots as a fulcrum comprises the bight portion of another U-shaped portion of the bracket with the bight positioned within a selected window of vertical distances, relative to the face of the header plate, from the bottom of the motion transfer projection of the spring contact arm. The contacts closed contact force can be adjusted by applying a downward force on the second leg. Assembly of the protector is completed by hermetically welding an elliptical dome shaped housing with a portion of the housing preferably being deformed at a location aligned with the movable contact to serve as a motion limiting stop.

DESCRIPTION OF THE DRAWINGS

Other objects, advantages and specific features of the novel and improved hermetic motor protector of the invention appear in the following detailed description of the preferred embodiment of the invention, the detailed description referring to the drawings in which.

DETAILED DESCRIPTION OF PREFERRED EMBODIMENT

Figure 1:
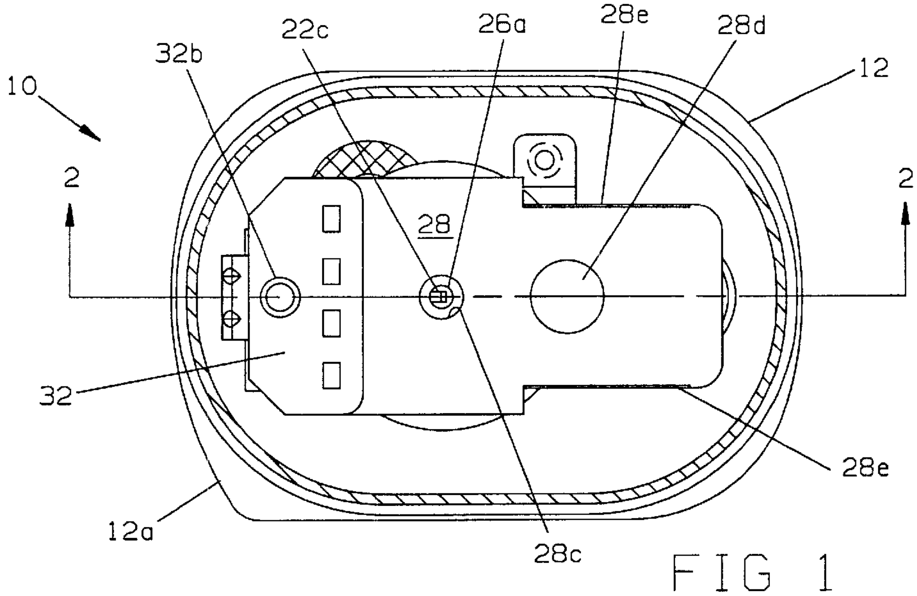
FIG. 1 is a top plan view of a hermetic motor protector made in accordance with the invention shown with the cover cut away.

A hermetic motor protector 10 made in accordance with the invention comprises a header plate 12 of suitable electrically conductive material, such as cold rolled steel, generally oval in shape when viewed from above and preferably provided with an orientation feature such as corner portion 12a. First and second bores 12b, 12c are formed through header plate 12 for receipt therethrough of respective first and second terminal pins 14, 16 electrically isolated from the header plate by suitable glass material 18. An electrical contact 20 is suitably mounted on the butt end of terminal pin 14, as by welding, spaced above floor surface 12d to conform with the position of other protector components to be described and to provide a suitable dielectric distance between the header plate and stationary contact 20.

Figure 2:
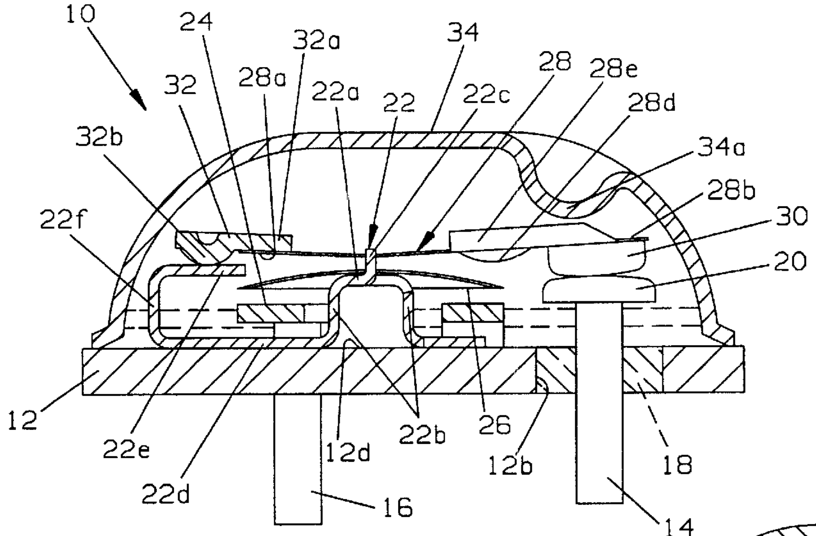
FIG. 2 is a cross sectional view taken on line 2—2 of FIG. 1.
Figure 3:
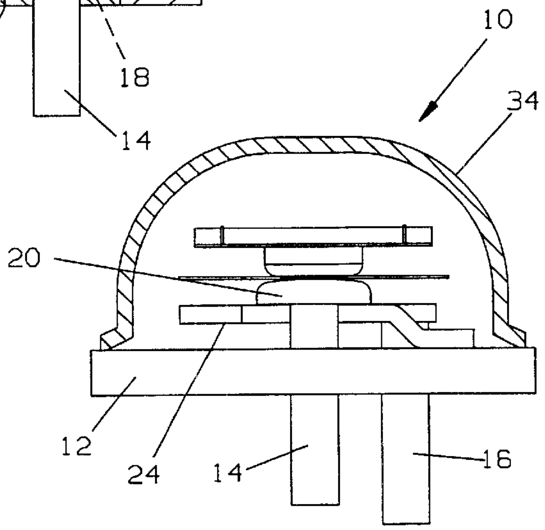
FIG. 3 is a side elevational view shown with the cover in cross section.

A bracket 22 formed of suitable electrically conductive material such as plated cold rolled steel, is mounted on floor 12d, as by welding and has a first generally U-shaped portion comprising a disc seating bight 22a spaced above floor 12d by legs 22b. A tab 22c whose function will be discussed below projects vertically upward from bight portion 22a, as seen in FIG. 2. A second generally U-shaped portion comprises first and second legs 22d, 22e joined by bight portion 22f. Leg 22d is disposed on floor surface 12d while leg 22e extends generally parallel to and above the floor surface by bight portion 22f.

Figure 4A:
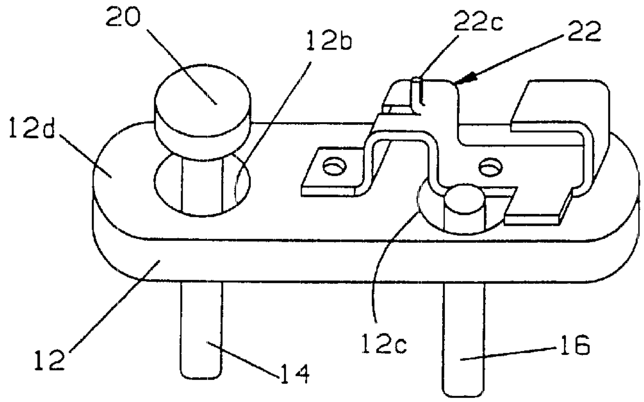
FIGS. 4a–4d show perspective views of a partially assembled hermetic motor protector at different stages of assembly.
Figure 4B:
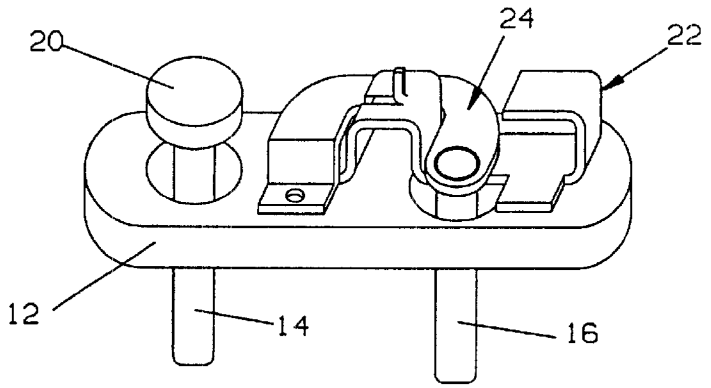
Figure 4C:
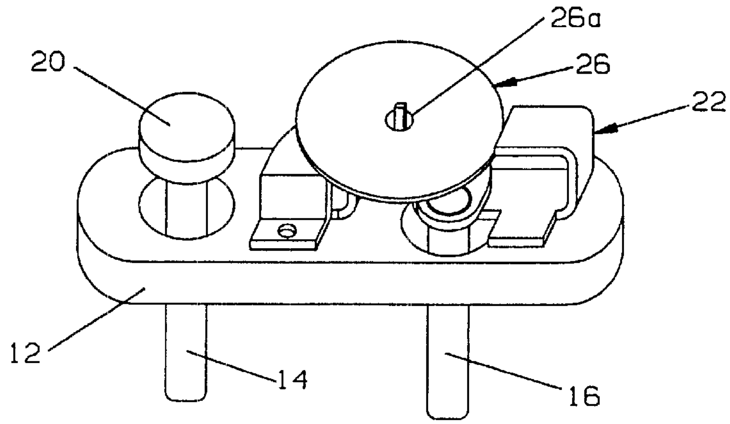
Figure 4D:
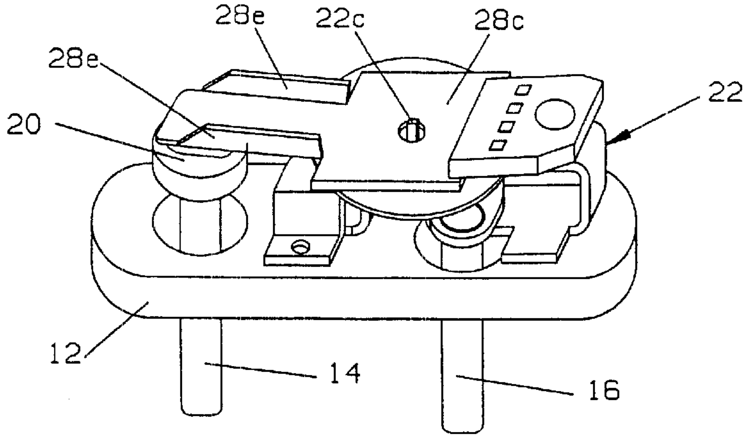

A heater element 24 composed of suitable material based on the particular motor application for which the protector is intended, e.g., steel, alloy 52, etc., has one end butt welded to the end of terminal pin 16 and its opposite end formed into an L-shaped portion for spacing the heater element above the header plate, welded to header plate 12. Heater element 24 is preferably configured as a loop extending at least part way around legs 22b and disc seating bight 22a, see FIG. 4b.

A heat responsive, non-current carrying, bimetallic disc 26 is disposed on disc seat 22a with tab 22c received through a centrally located aperture 26a in disc 26. Disc 26 is dished shape to provide snap-action between oppositely dished-shaped configurations when heated to a preselected actuation temperature. The disc is placed on disc seat 22a with an outer peripheral portion thereof received under leg 22e of bracket 22 and is preferably circular in shape making it insensitive to angular orientation. As noted in FIG. 2, disc 26 is arranged such that its normal ambient temperature, concave dished configuration faces header plate 12.

A movable spring contact arm 28 is cantilever mounted on the top surface of leg 22e at one end 28a through welding slug 32 and mounts a movable electrical contact 30 on the distal free end portion 28b of the contact arm. Contact arm 28 is adapted to move into and out of electrical engagement with stationary contact 20 and is normally biased into engagement therewith. Contact arm 28 is formed with an aperture 28c which receives tab portion 22c therethrough thereby preventing dislocation of disc 26. A welding slug 32, of suitable material such as cold rolled steel, has a plate portion 32a for welding attachment to end 28a of the spring contact arm and a welding projection 32b for welding attachment to leg 22e. Spring contact arm 28 is formed of suitable electrically conductive material having good spring characteristics, such as beryllium copper and is formed with a downwardly extending motion transfer projection or bump 28d disposed diametrically opposite to leg 22e and aligned with the outer peripheral portion of disc 26. Laterally extending back and front edge portions 28e of contact arm 28 are bent upwardly to stiffen the outer portion of the arm, i.e., that portion of the arm outboard of and including the motion transfer bump 28d.

An oval domed shaped cover 34 of suitable material such as steel is received on header plate 12 and hermetically welded thereto forming a switch chamber for the several components of the protector. The cover is preferably deformed at 34a in alignment with the movement of movable contact 30 to provide an over-travel stop for movable contact arm 28.

The current path of the protector extends from terminal pin 16 through heater element 24, header plate 12, bracket 22, slug 32, movable spring contact arm 28, movable contact 30, stationary contact 20 to terminal pin 14. The terminal pins are serially connected to a motor circuit so that upon an overcurrent condition heat generated by heater element 24 is radiated to disc 26, along with heat conducted by the motor windings through the protector housing, raising the temperature of the disc to its actuation temperature when the disc snaps to an oppositely dished configuration, i.e., a downwardly facing convex configuration (not shown in the drawing). Movement of that portion of disc 26 under leg 22e is constrained causing the disc to pivot on disc seat or bight 22a so that the outer peripheral portion of the disc diametrically opposite to leg 22e engages motion transfer bump 28d and pushes movable contact arm 28 upwardly with leveraged movement thereby moving movable contact 30 out of contact engagement with stationary contact 20. When the temperature of the motor reaches a safe level which allows the disc to cool to its reset temperature the protector will automatically reset.

During assembly of the protector the vertical distance, relative to header plate surface 12d, between the top of disc seat 22a and the bottom of motion transfer bump 28d is maintained within a preselected window of distances. Further, a force can be applied through welding slug 32 in order to obtain a selected contact force between the contacts in the normally contacts engaged position.

According to the invention, the protector's opening temperature is the same as the disc free snap open temperature with switching being effected by positioning motion transfer bump 28d of movable contact arm 28 within the dimensional window relative to disc 26 on disc seat 22a. Such positioning does not require temperature calibration and results in a larger dimensional window than provided in prior art hermetic compressors resulting in improved product yields. Manufacturing costs for making protectors according to the invention are reduced by eliminating temperature calibration and by utilizing a common disc with common dimensional set-up. High cycle life is achieved due to a reduction in contact arm fatigue stress existing in prior art devices. The invention results in tighter temperature and improved ultimate trip capability over cycle life associated with non-current carrying disc designs.

It should be understood that although a particular embodiment of the motor protector of this invention has been described, various modifications can be made which come within the purview of the invention. For example, although bracket 22 is described as being electrically conductive, the disc seat portion need not be conductive since disc 26 is non-current carrying. With regard to the heater, it should be noted that the heater element can be formed to serve as a fusible link to ensure that the device fails in an open state.

Although disc 26 is advantageously mounted on bracket 22 through tab 22c to provide leveraged movement of movable arm 28, it will be appreciated that, if desired, the disc could also be supported by its outer periphery with a fulcrum disposed in a location below the disc corresponding to bight 22a and with a motion limiting member extending over the outer periphery of the disc at a location diametrically opposite to the motion transfer bump of the movable contact arm. It is the intention that the invention include all modifications and equivalents of the disclosed embodiment falling within the scope of the appended claims.

What is claimed:

1. A motor protector comprising
   an electrically conductive base plate having a mounting surface,
   an electrically conductive bracket mounted on the mounting surface, the bracket having a first leg spaced from and extending transversely across a portion of the mounting surface, the bracket having a generally U-shaped portion forming a disc seating bight extending away from the mounting surface to position the disc seating bight at a location spaced from the mounting surface, a tab extending from the bight in a direction generally vertically away from the mounting surface,
   a snap-acting thermostatic disc movable between opposite concave, convex dished configurations upon being heated to an actuation temperature, the disc having a centrally disposed aperture therethrough, the disc disposed on the disc seating bight with the tab received through the disc aperture and with the dished shaped configuration facing the mounting surface being concave,
   an electrically conductive movable contact arm cantilever mounted on the first leg and extending across the disc, the movable contact arm having a free distal end portion, a movable contact mounted on the free distal end portion,
   a terminal pin extending through an aperture in the base plate and electrically separated therefrom, a stationary contact mounted on the terminal pin with the movable contact arm normally biasing the movable contact into contact engagement with the stationary contact,
   another terminal pin extending through an aperture in the base plate and electrically separated therefrom, a heater element having a first end connected to the said another terminal pin and a second end connected to the base plate,
   the disc having an outer peripheral portion received under the first leg limiting movement of the disc at the location of the first leg so that upon snapping to the opposite dished configuration the disc pivots on the disc seating bight with the outer peripheral portion of the disc diametrically opposite to the first leg engaging the movable contact arm to move the movable contact arm to a contacts disengaged position.

2. A motor protector according to claim 1 in which an aperture is formed through the movable contact arm and the tab extending from the disc seating bight is received through the aperture in the movable contact arm.

3. A motor protector according to claim 1 further comprising a dome shaped cover received over the mounting surface and being hermetically attached to the conductive base plate.

4. A motor protector according to claim 3 in which the cover has a deformed portion and the movable contact has a path of movement, the deformed portion of the cover serving as a motion limiting stop, the deformed portion disposed in alignment with the path of movement of the movable contact and spaced a selected distance above the stationary contact.

5. A motor protector comprising an electrically conductive base plate having a mounting surface and formed with terminal receiving apertures therethrough, first and second terminal pins extending through respective terminal receiving apertures in spaced apart relation to the base plate, a stationary contact mounted on the first terminal pin, a bracket with an upstanding tab, the bracket mounted on the base plate, a movable contact and a movable contact arm, the movable contact mounted on the movable contact arm and the movable contact arm mounted on the bracket and electrically connected to the base plate, the movable contact being movable into and out of contacts engaged positions with the stationary contact and normally biased into the contact engaged position, a heater element having two opposite ends, one end connected to the second terminal pin and the second end connected to the base plate so that the base plate forms at least part of a current path between the heater element and the movable contact arm, a non-current carrying bimetallic snap acting disc movable between first and second oppositely dished configuration being generally circular having a centrally disposed aperture therethrough, the disc disposed in he t transfer relation with the heater element, and a disc seat surface formed on the bracket with the upstanding tab received through the centrally disposed aperture, the disc having an outer periphery with a portion thereof received under a motion limiting surface a selected distance when the disc is in the first of its dished configurations so that actuation of the disc to the second dished configuration causes the said portion of the outer periphery to engage the motion limiting surface resulting in the disc pivoting on the disc seat surface as a fulcrum with the diametrically opposite outer periphery of the disc applying amplified contacts disengagement motion thereby moving the movable contact i to the contacts disengaged position.

6. A motor protector comprising
   an electrically conductive base plate having a mounting surface,
   an electrically conductive bracket mounted on the mounting surface,
   a disc support for supporting the outer periphery of a disc, the disc support having a fulcrum,
   a snap-acting thermostatic disc movable between opposite concave, convex dished configurations upon being heated to an actuation temperature disposed on the disc support with the fulcrum located beneath the disc and with the normally concave dished shaped configuration facing the base plate,
   an electrically conductive movable contact arm cantilever mounted on the bracket and extending across the disc, the movable contact arm having a free distal end portion, a movable contact mounted on the free distal end portion,
   a terminal pin extending through an aperture in the base plate and electrically separated therefrom, a stationary contact mounted on the terminal pin with the movable contact arm normally biasing the movable contact into contact engagement with the stationary contact,
   another terminal pin extending through an aperture in the base plate and electrically separated therefrom, a heater element having a first end connected to the said another terminal pin and a second end connected to the base plate and being in heat transfer relation with the disc, a motion limiting stop, the disc having an outer peripheral portion received under the motion limiting stop limiting movement of the disc at the location of the motion limiting stop so that upon snapping to the opposite dished configuration the disc pivots on the fulcrum of the disc support with the outer peripheral portion of the disc diametrically opposite to the motion limiting stop engaging the movable contact arm to move the movable contact arm to a contacts disengaged position.

* * * * *